(12) United States Patent
Goedecke

(10) Patent No.: US 6,452,383 B1
(45) Date of Patent: Sep. 17, 2002

(54) RING MAGNET FOR A ROTATION SENSOR, AND MOUNTING STRUCTURE THEREFOR

(75) Inventor: Martin Goedecke, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,024

(22) PCT Filed: Nov. 3, 1999

(86) PCT No.: PCT/DE99/03507

§ 371 (c)(1),
(2), (4) Date: Nov. 9, 2000

(87) PCT Pub. No.: WO00/48006

PCT Pub. Date: Aug. 17, 2000

(30) Foreign Application Priority Data

Feb. 9, 1999 (DE) .......................... 199 05 274

(51) Int. Cl.⁷ ............................ G01P 3/487; G01B 7/30; H01F 7/02
(52) U.S. Cl. ............. 324/207.22; 324/174; 324/207.25; 305/302; 310/156.12
(58) Field of Search ....................... 324/207.22, 207.25, 324/173, 174; 335/302; 310/68 B, 156.08–156.15; 29/595, 598

(56) References Cited

U.S. PATENT DOCUMENTS

| | | | |
|---|---|---|---|
| 5,239,263 A | * | 8/1993 | Iwata et al. .......... 324/207.22 X |
| 5,945,758 A | * | 8/1999 | Goltz et al. .......... 310/156.13 X |
| 6,198,372 B1 | * | 3/2001 | Schwarz .................... 335/302 |

* cited by examiner

Primary Examiner—Gerard R. Strecker
(74) Attorney, Agent, or Firm—Ronald E. Greigg

(57) ABSTRACT

In a rotation angle or rpm sensor having a pulse transducer seated on a rotation element, which has a ring magnet made as an injection molded part and a metal bush that receives the ring magnet by positive engagement, for the sake of a rigid connection between the ring magnet and rotation element, which is favorable from a production standpoint, the ring magnet is received with a first annular portion on the bush and with a second annular portion is seated with a press fit on the rotation element. The bush is fastened to the rotation element in the region of a bush portion that protrudes from the face end of the ring magnet, and the positive engagement between the bush and the first annular portion is made by shaped elements on the outer circumference of the bush, onto which the ring magnet is extruded.

15 Claims, 4 Drawing Sheets

RING MAGNET FOR A ROTATION SENSOR, AND MOUNTING STRUCTURE THEREFOR

BACKGROUND OF THE INVENTION

1. Field of the Invention

This invention is directed to rotation sensors, and more particularly to a rotation sensor having a pulse transducer, seated on a rotation element, in particular on a shaft of a motor drive mechanism.

2. Description of the Prior Art

The term rotation sensor will be used hereinafter as a synonym for an rpm or rotation angle meter. Such rotation sensors are most often made using stationary Hall sensors or rotating ring magnets that have north and south poles alternating in the circumferential direction. Rotational angles can be measured directly with analog Hall sensors, and rotational speeds, i.e., rpm, can be measured directly with digital Hall sensors. From the rpm or rotation angle, further measurement variables can be derived in turn, such as the rotary travel or stroke travel.

A known rotation sensor of this type disclosed in European Patent Disclosure EP 0 821 240 A1 is disposed in a roller bearing, and the pulse transducer is seated on the inner ring of the bearing that is connected to a shaft in a manner fixed against relative rotation, and the pickup that contactlessly senses the pulses is secured to the stationary outer ring of the roller bearing. The ring magnet, made of a plastoferrite, of the pulse transducer has a hollow magnet body with successive north and south poles on the circumference, and upon its rotation it generates a change in the magnetic field relative to a fixed point. These magnetic field changes are converted into electrical signal by stationary pickups. For fastening the pulse transducer to the inner ring of the roller bearing, the ring magnet is seated in a manner fixed against relative rotation on the metal bush, embodied as a thin sheet-metal sleeve, and this fastening is accomplished by crimping over the edge of the sleeve onto the annular face end of the hollow-cylindrical magnet body. The sheet-metal sleeve is press-fitted in turn onto the outer surface of the inner ring of the roller bearing.

In another known rotation sensor of the type defined at the outset (EP 0 601 228 B1), the ring magnet of the pulse transducer is made from magnetizable particles, which are available in powder form, and a binder of thermoplastic material. The proportion of powder comprising magnetizable particles is selected to be as high as possible, so that the ring magnet molded by injection molding will be capable of tripping the clearest possible signals in the pickup. However, this makes the magnet body brittle, and the magnet body is therefore given an inside diameter that in combination with the diameter of the shaft of a drive motor produces a sliding seat and the magnet body is glued or bonded to the shaft. One disadvantage is that the adhesive contains solvents and/or other chemicals and requires a long time to set.

To avoid gluing the hollow-cylindrical magnet body to the shaft, EP 0 601 228 B1 has already proposed using a retaining part, which when paired with the shaft forms a press fit, for transmitting torque from the shaft to the hollow-cylindrical magnet body. This transmission is done by means, such as arms, that act by positive engagement and have hooks protruding axially from the free ends and extend through grooves provided in the hollow-cylindrical magnet body. This retaining part is injection molded integrally with the arms and hooks from thermoplastic material.

SUMMARY OF THE INVENTION

The rotation sensor according to the present invention has the advantage that the production problems that occur in gluing are avoided, and the pulse transducer can be made in a way that is simple from a production standpoint. The press fit assures the most accurate possible alignment of the ring magnet with the rotation element, and the metal bush assures a reliable connection, in a manner fixed against relative rotation, of the ring magnet to the rotation element, and this connection can be made in a manner that is favorable from a production standpoint in the bush portion that protrudes from the ring magnet. Preferably, a clearance fit is provided between the rotation element, embodied for instance as a supported shaft, and the metal bush, so that in assembly, the bearing point on the shaft will not be damaged. If the entire rotation sensor does not have to be thrust over a bearing point, then a transitional or press fit can be used.

The rigid connection of the bush to the rotation element inside the bush portion that protrudes from the ring magnet and the embodiment of the shaped elements on the circumference of the metal bush can be accomplished in various ways.

In one preferred embodiment of the invention, the fastening of the bush portion to the rotation element is done by press resistance welding, known as hot staking, in which both a tensing force and an electric current are applied to the bush portion by means of electrodes radially positioned against it.

In further advantageous embodiments of the invention, the connection between the bush portion and the rotation element can also be made by nonpositive pressing of the bush portion on the rotation element or by positive engagement between the bush portion and the rotation element.

In an advantageous embodiment of the invention, the shaped elements on the circumference of the metal bush for establishing the positive engagement between it and the ring magnet are embodied as knurling, axial grooves, a set of notched teeth, and the like.

BRIEF DESCRIPTION OF THE DRAWINGS

The invention is explained in further detail in the ensuing description taken in conjuction with the drawings, in which.

DESCRIPTION OF THE PREFERRED EMBODIMENTS

Figure 1:
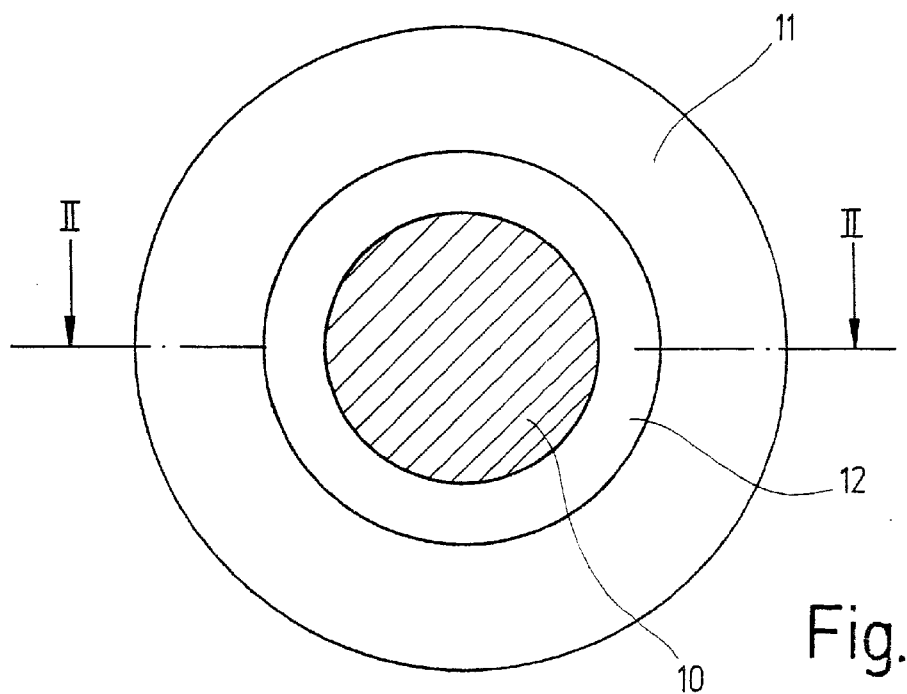
FIG. 1, an end view of a pulse transducer of a rotation sensor in the direction of arrow I in FIG. 2.
Figure 2:
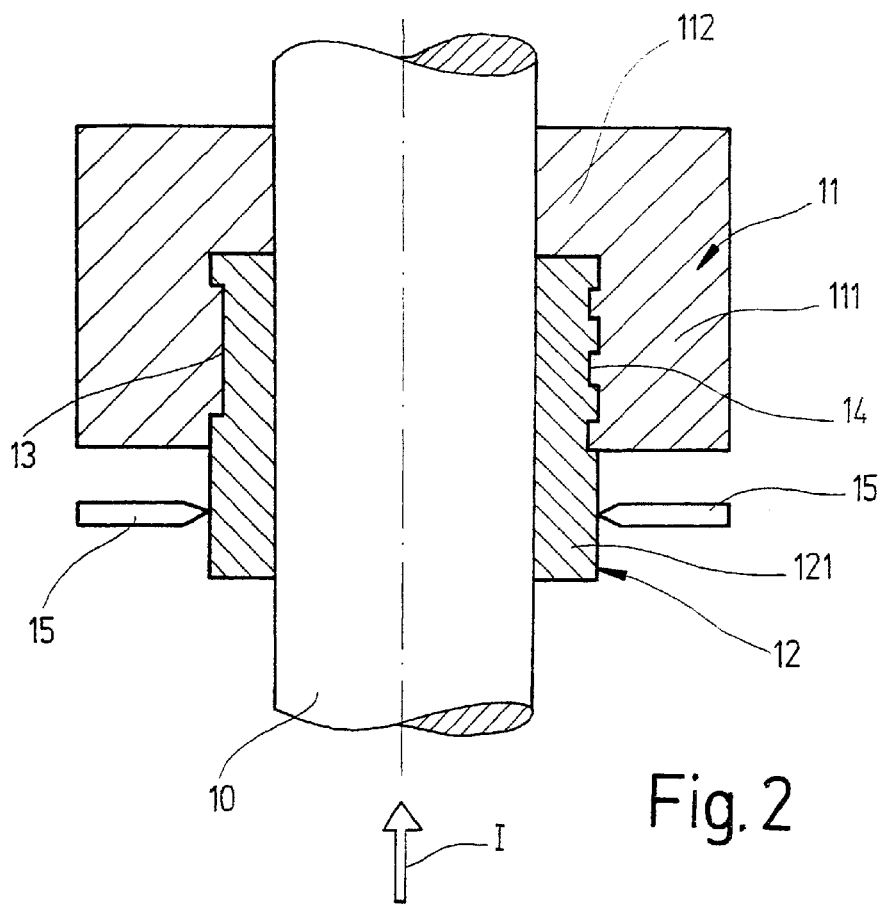
FIG. 2, a section taken along the line II—II in FIG. 1.

The pulse transducer for a rotation sensor, shown in end view and section in FIGS. 1 and 2, is fastened to the drive shaft 10 of a motor drive mechanism, such as an electric motor for a window control of a motor vehicle. It has a ring magnet 11 of plastoferrite, manufactured as an injection-molded part, with alternating north and south poles over the circumference, and is connected to the shaft 10 in a manner secured against relative rotation and axially nondisplaceably. To that end, the ring magnet 11 is received with a first, axial annular portion 111 by positive engagement on a metal bush 12 and with a second annular portion 112 having a smaller inside diameter which is slipped with a press fit onto the shaft 10. The positive engagement between the bush and the first annular portion 111 is established by shaped elements machined onto or into the outer circumference of the bush 12, onto which the ring magnet 11 is extruded by placement of the metal bush 12 in the injection mold.

In FIG. 2, two exemplary embodiments for shaped elements are shown. In the left half of the sectional view, the shaped elements have at least one axial groove 13, and preferably a plurality of axial grooves 13 are provided, distributed over the circumference of the metal bush 12. In the right half of the symmetrical view of FIG. 2, the shaped elements are embodied as a set of external teeth 14. It is also possible to embody the shaped elements as knurling. The metal bush 12 protrudes with an axial bush portion 121 out of the ring magnet 11 and is secured axially and radially nondisplaceably on the shaft 10 in this bush portion 121.

In the exemplary embodiment of FIG. 2, the fastening of the bush portion 121 to the shaft 10 is done by press-resistance welding (hot staking), in which both a tensing force and an electric current are applied to the bush portion 121 by means of electrodes 15 positioned radially against it.

Figure 3:
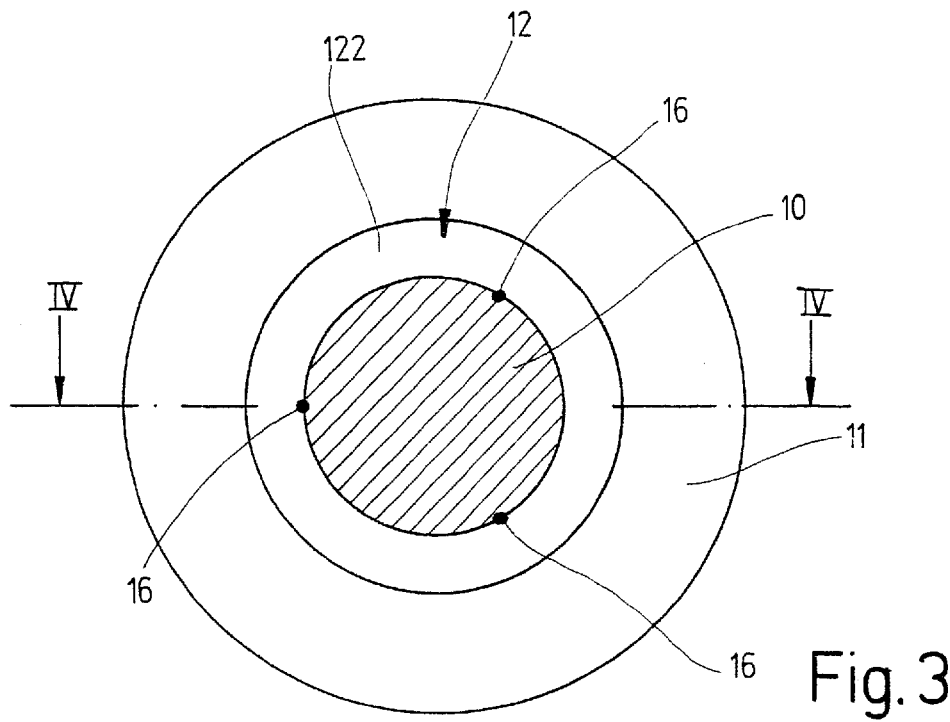
FIG. 3, an end view of a modified pulse transducer in the direction of arrow III in FIG. 4.
Figure 4:
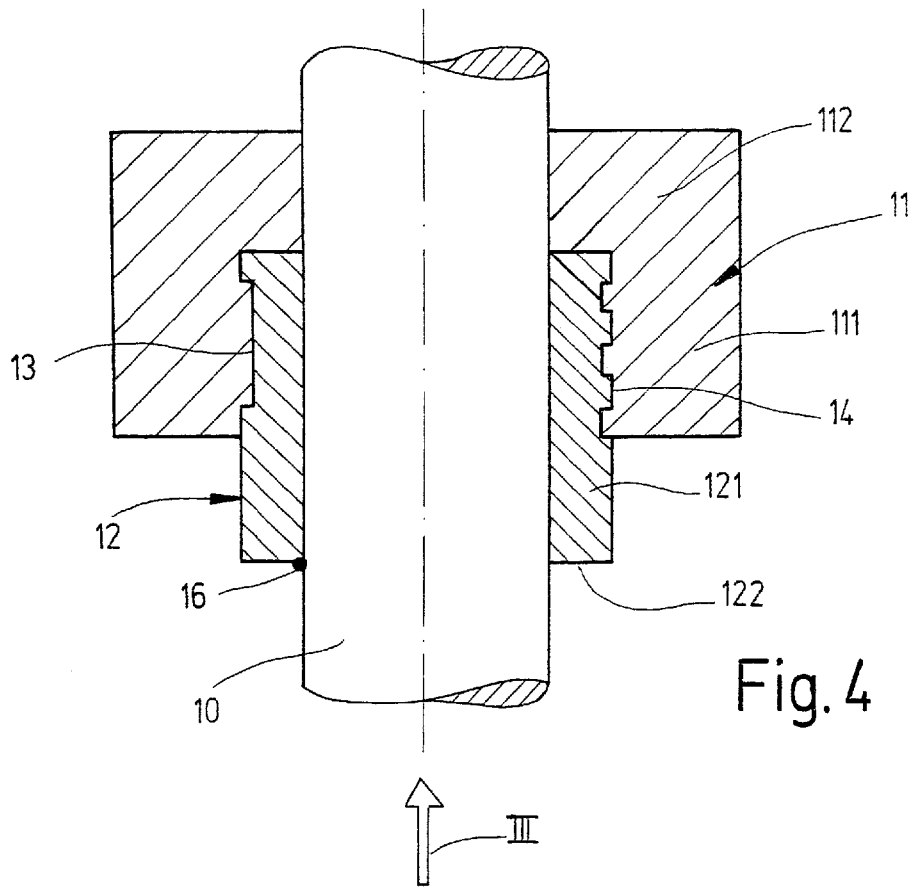
FIG. 4, a section taken along the line IV—IV of FIG. 3.

In the exemplary embodiment shown in FIGS. 3 and 4, the fastening of the bush portion 121 to the shaft 10 is done by welding the face end 122 of the bush portion 121 to the shaft 10. In the exemplary embodiment of FIGS. 3 and 4, a total of three spot welds 16 are distributed uniformly over the circumference of the bush portion 121, but the number of spot welds 16 will be varied, depending on the required strength of the connection.

Figure 5:
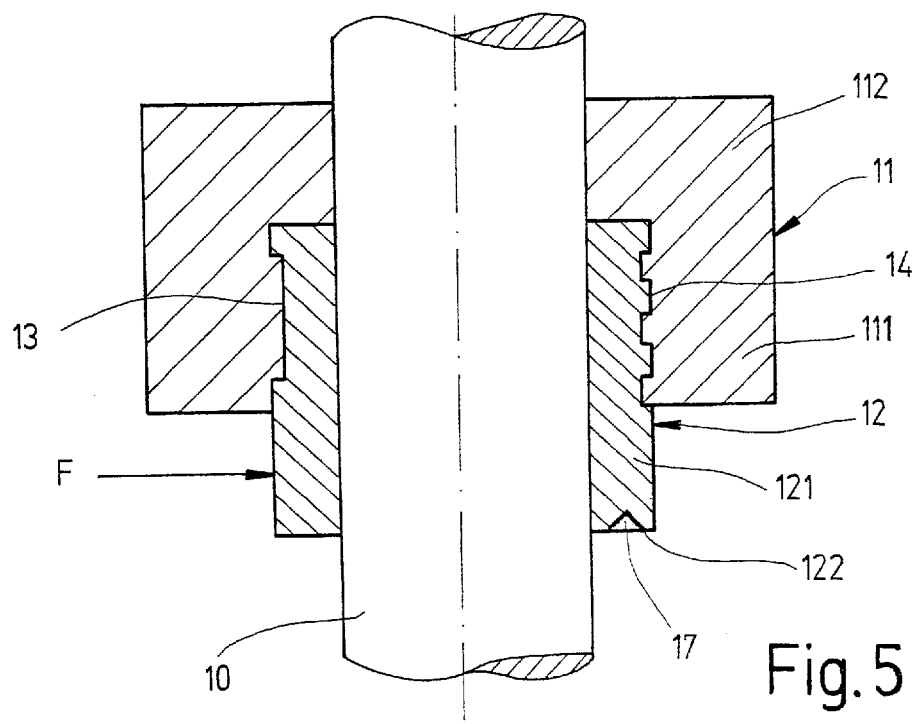
FIGS. 5–8, each a view similar to FIG. 4 in accordance with further exemplary embodiments of the pulse transducer.

In the exemplary embodiment of the pulse transducer in FIG. 5, the fastening of the bush portion 121 to the shaft 10 is accomplished by nonpositive pressing of the bush portion 121 on the shaft 10. To that end, as indicated in the left symmetrical half of FIG. 5, pressing forces F acting in point or area form are exerted radially on the bush portion 121. As indicated in the right symmetrical half of FIG. 5, the pressing of the bush portion 121 on the shaft 10 can also be done by notching, and therefore notches 17 are pressed or hammered into the annular face end 122 of the bush portion 121.

Figure 6:
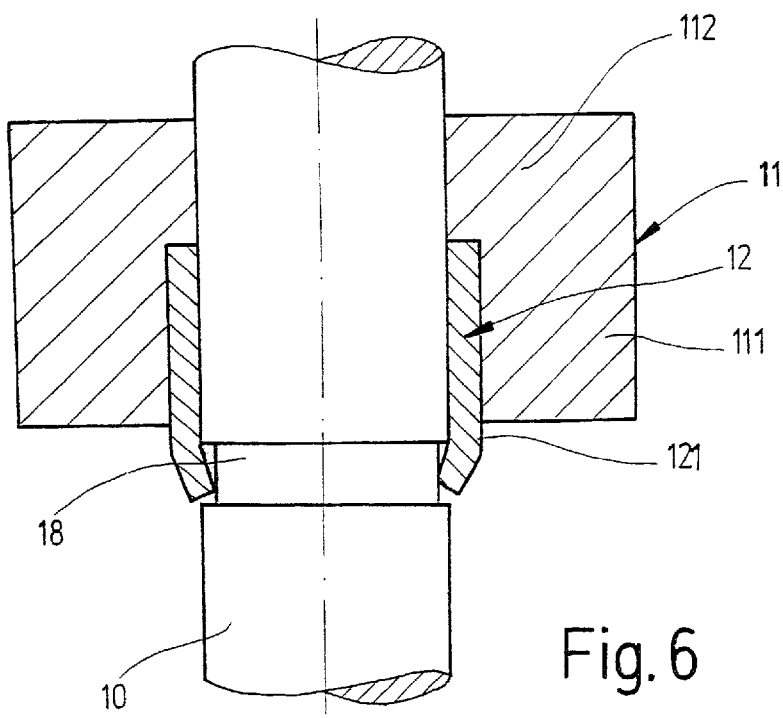

In the exemplary embodiment of the pulse transducer of FIG. 6, the pressing of the bush portion 121 on the shaft 10 is done by an encompassing crimped connection, in which the free end of the bush portion 121 is crimped into an annular groove 18 machined into the shaft 10.

Figure 7:
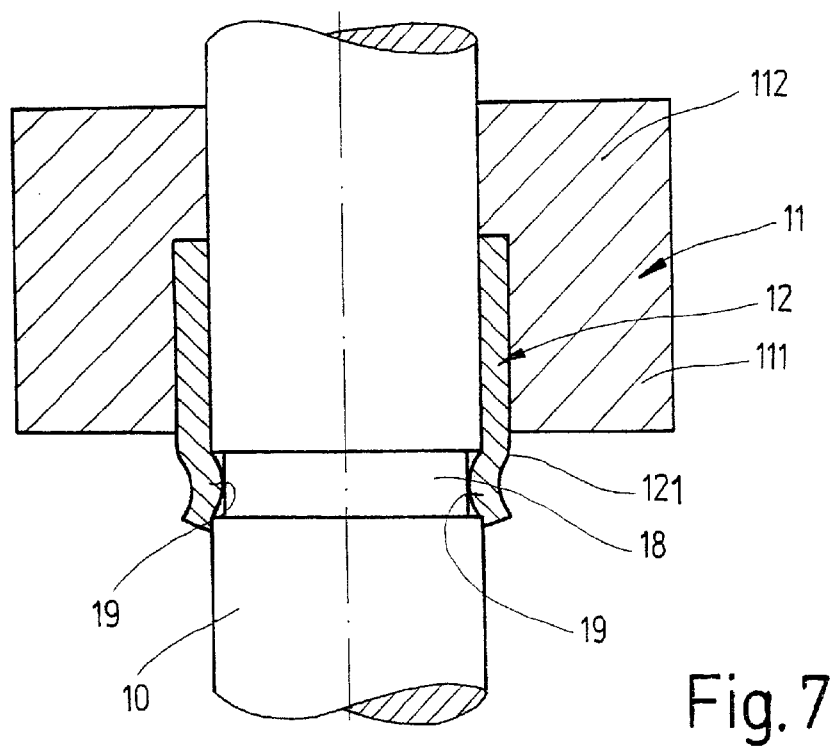

In the exemplary embodiment of the pulse transducer shown in FIG. 7, the pressing of the bush portion 121 on the shaft 10 is done by an encompassing bead connection, in which a plurality of beads 19, radially pressed out or wedged out of the bush portion 121 and distributed over its circumference, are press-fitted into an annular groove 18 machined into the shaft 10.

Figure 8:
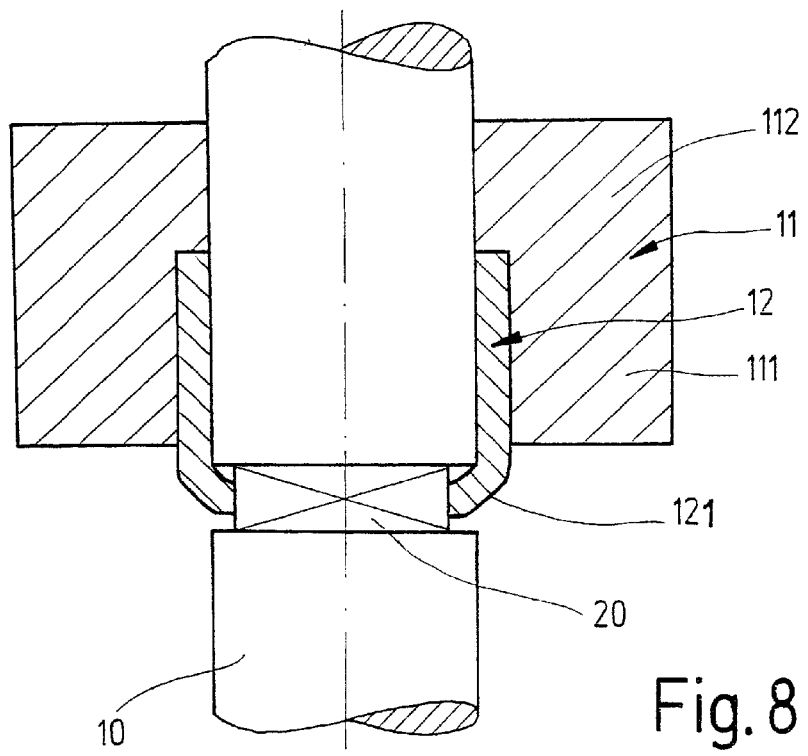

In the exemplary embodiment of the pulse transducer in FIG. 8, the fastening of the bush portion 121 to the shaft 10 is done by positive engagement. The positive engagement is effected in turn by means of a crimped connection, in which the free end of the bush portion 121 is crimped into a portion, punched into the shaft 10, that has at least one face 20 embodied as a secant. In the exemplary embodiment of FIG. 8, this portion is embodied as a square, so that a total of four faces 20 of the portion, oriented at right angles to one another, are present on the shaft 10.

In the exemplary embodiments of FIGS. 6–8, no attempt has been to illustrate the positive engagement between the ring magnet 11 and the bush portion 121 of the metal bush 12. However, it is present in the same form as in the exemplary embodiments of FIGS. 1–5.

The foregoing relates to preferred exemplary embodiments of the invention, it being understood that other variants and embodiments thereof are possible within the spirit and scope of the invention, the latter being defined by the appended claims.

I claim:

1. In a rotation sensor, having a pulse transducer seated on a rotation element (10), on a shaft of a motor drive mechanism, which transducer has a ring magnet (11) having a face end, manufactured as an injection molded part, and a metal bush (12) that by positive engagement receives the ring magnet (11) and is coaxially slipped onto the rotation element (10) and fixed radially and axially nondisplaceably on it, the improvement wherein the ring magnet (11) is received with a first annular portion (111) on the bush (12) and is seated with a second annular portion (112), having a smaller inside diameter, with a press fit on the rotation element (10); the positive engagement between the bush (12) and the first annular portion (111) being made by shaped elements (13, 14) machined onto the outer circumference of the bush (12), onto which elements the ring magnet (11) is extruded; and wherein the bush (12) is secured to the rotation element (10) in the region of a bush portion (121) that protrudes from the face end out of the ring magnet (11).

2. The sensor of claim 1, wherein a clearance fit is provided between the bush (12) and the rotation element (10).

3. The sensor of claim 1, wherein the bush portion (121) is fastened to the rotation element (10) by press resistance welding, and wherein a tensing force and an electrical current are applied to the bush portion (121) by means of electrodes (15) positioned radially against the bush portion.

4. The sensor of claim 1, wherein the bush portion (121) is fastened to the rotation element (10) by at least spot welding of the face end (122) of the bush portion (121 ) to the rotation element (10).

5. The sensor of claim 1, wherein the rotation element (10), as fastened to the bush portion (121) by nonpositively pressing the bush position on the rotation element (10).

6. The sensor of claim 5, wherein said rotation element is fastened to the bush portion by notches (17) pressed or hammered into the annular face end (122) of the bush portion (121).

7. The sensor of claim 5, wherein the rotation element (10) is fastened to the bush portion by a bead connection extending all the way around on the bush portion (121), said bead connection including beads (19) pressed radially out of the bush portion (121) and distributed over its circumference and are press fitted into an annular groove (18) machined into the rotation element (10).

8. The sensor of claim 5, wherein the rotation element is fastened to the bush portion by a crimped connection in which the free end of the bush portion (121) is crimped into an annular groove (18) machined into the rotation element (10).

9. The sensor of claim 1, wherein the bush portion (121) is fastened to the rotation element (10) by positive engagement.

10. The sensor of claim 9, wherein said postive engagement comprises a crimped connection in which the free end of the bush portion (121) is crimped into a portion having at least one face (20) embodied as a secant, which portion is punched onto the rotation element (10).

11. The sensor of claim 1, wherein the shaped elements for making the positive engagement between the metal bush (10) and the first annular portion (111) of the ring magnet (11) are embodied as knurling, axial grooves (13), or a set of notched teeth (14).

12. The sensor of claim 2, wherein the bush portion (121) is fastened to the rotation element (10) by press resistance welding, and wherein a tensing force and an electrical current are applied to the bush portion (121) by means of electrodes (15) positioned radially against the bush portion.

13. The sensor of claim 2, wherein the bush portion (121) is fastened to the rotation element (10) by at least spot welding of the face end (122) of the bush portion (121) to the rotation element (10).

14. The sensor of claim 2, wherein the rotation element (10), as fastened to the bush portion (121) by nonpositively pressing the bush position on the rotation element (10).

15. The sensor of claim 2, wherein the bush portion (121) is fastened to the rotation element (10) by positive engagement.

* * * * *